(12) United States Patent
Winger

(10) Patent No.: US 7,983,504 B2
(45) Date of Patent: Jul. 19, 2011

(54) SIGN CORING FOR CONTOUR REDUCTION

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 58 days.

(21) Appl. No.: 12/624,548

(22) Filed: Nov. 24, 2009

(65) Prior Publication Data

US 2010/0067817 A1 Mar. 18, 2010

Related U.S. Application Data

(62) Division of application No. 11/362,936, filed on Feb. 27, 2006, now Pat. No. 7,650,042.

(51) Int. Cl.
*G06K 9/40* (2006.01)
(52) U.S. Cl. .................. 382/260; 382/221
(58) Field of Classification Search .......... 345/25, 345/26, 545, 546, 560, E9.042, E5.064; 348/319, 348/605, 628, E5.016, E5.064, E9.042, 14.15, 348/26, 400.1, 437.1, 438.1, 666, 701, 912; 356/489, 495, 511; 382/219, 221, 260, 266, 382/267, 268; 702/167
See application file for complete search history.

(56) References Cited

U.S. PATENT DOCUMENTS

| | | | | |
|---|---|---|---|---|
| 5,488,430 | A * | 1/1996 | Hong | 348/699 |
| 5,892,551 | A * | 4/1999 | Uematsu | 348/447 |
| 6,304,605 | B1 | 10/2001 | Haikonen et al. | 375/240.24 |
| 7,002,636 | B2 * | 2/2006 | Ishikawa et al. | 348/625 |
| 2002/0196373 | A1 | 12/2002 | Szybiak et al. | 348/700 |
| 2006/0158531 | A1 | 7/2006 | Yanof | 348/226.1 |

* cited by examiner

*Primary Examiner* — Gregory F Cunningham
(74) *Attorney, Agent, or Firm* — Christopher P. Maiorana, PC

(57) ABSTRACT

A method for contour reduction in a digital picture is disclosed. The method generally includes the steps of (A) buffering a plurality of luma samples in a current line of the digital picture, each of the luma samples having a respective input value, (B) calculating a plurality of horizontal sum-of-signs along the current line, wherein each of the horizontal sum-of-signs comprises a sum of a plurality of amplitude differences between pairs the luma samples from the current line and (C) generating a plurality of output value based on the horizontal sum-of-signs, one of the output values for each one of the luma samples.

20 Claims, 5 Drawing Sheets

US 7,983,504 B2

SIGN CORING FOR CONTOUR REDUCTION

This is a divisional of U.S. Ser. No. 11/362,936, filed Feb. 27, 2006, now U.S. Pat. No. 7,650,042 which is incorporated by reference.

FIELD OF THE INVENTION

The present invention relates to digital picture processing generally and, more particularly, to a sign coring for contour reduction.

BACKGROUND OF THE INVENTION

Contour reduction can be accomplished in various ways. Conventional contour reduction methods include standard coring (i.e., filtering with blending thresholds) and adding random noise (i.e., comfort noise). Since contours can be very wide in terms of a number of pixels, especially in high-definition television, the conventional filtering approaches incorporate very wide (i.e., many taps) and very strong filters (i.e., extremely strong lowpass filtering). The standard coring is good for mosquito noise removal with less strong filtering, but is not appropriate for contour reduction because a strong filtering (i.e., typically a many-point mean/average filter) will cause "halos" around strong edges in the image. Similarly, adding random noise is not always desirable, although the noise can hide many coding and quantization errors including contouring.

SUMMARY OF THE INVENTION

The present invention concerns a method for contour reduction in a digital picture. The method generally comprises the steps of (A) buffering a plurality of luma samples in a current line of the digital picture, each of the luma samples having a respective input value, (B) calculating a plurality of horizontal sum-of-signs along the current line, wherein each of the horizontal sum-of-signs comprises a sum of a plurality of amplitude differences between pairs the luma samples from the current line and (C) generating a plurality of output value based on the horizontal sum-of-signs, one of the output values for each one of the luma samples.

The objects, features and advantages of the present invention include providing a method and/or apparatus implementing a sign coring for contour reduction that may (i) distinguish between texture features and contour features within a given window, (ii) measure local vertical activity among adjacent pixels, (iii) measure local horizontal activity among neighboring pixels, (iv) implement a sum-of-signs (e.g., a nonlinear filter) prior to coring instead of a sum-of-differences (e.g., a linear filtering), (v) convert video from any lower bit-depth to a higher bit-depth, (vi) reduce subtle contouring due to MPEG encoding, (vii) reduce very low amplitude mosquito noise and/or (viii) reduce very subtle blocking effects.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
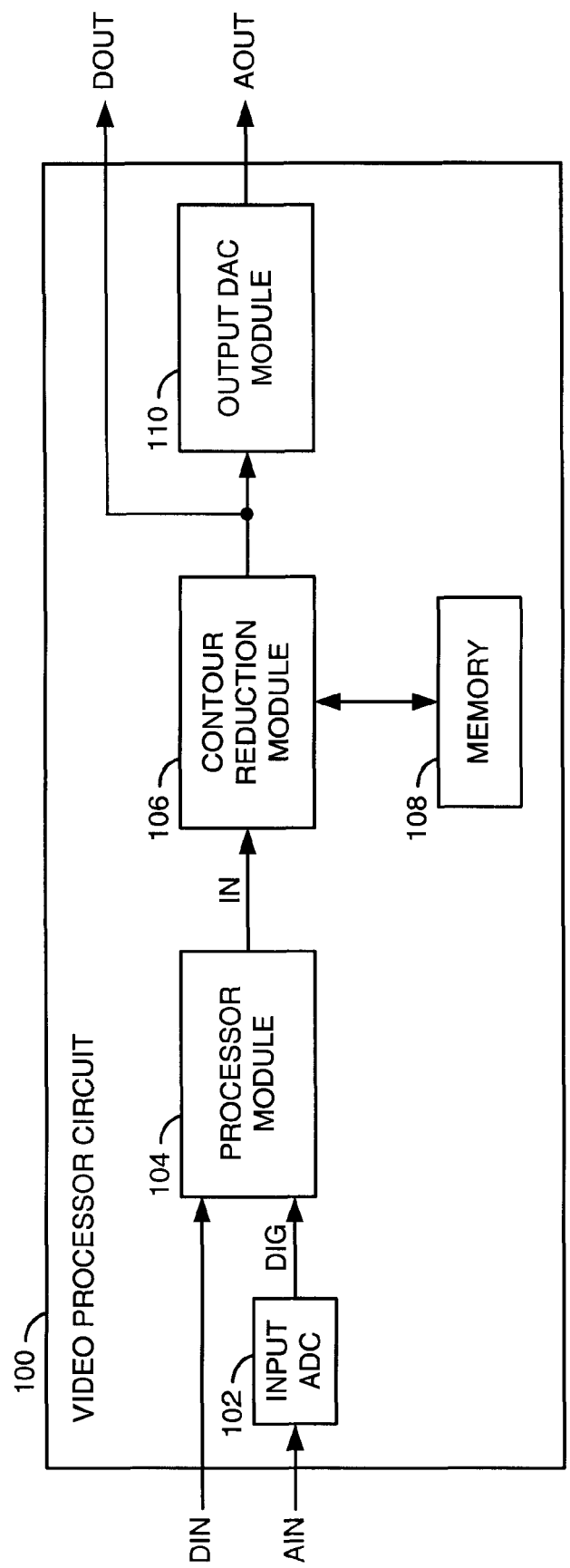
FIG. 1 is a block diagram of a circuit in accordance with a preferred embodiment of the present invention.

Referring to FIG. 1, a block diagram of a circuit 100 is shown in accordance with a preferred embodiment of the present invention. The circuit (or system) 100 may be referred to as a video processor circuit. A digital input signal (e.g., DIN) may be received by the video processor circuit 100. An analog input signal (e.g., AIN) may be received by the video processor circuit 100. The video processor circuit 100 may generate and present a digital output signal (e.g., DOUT). An analog output signal (e.g., AOUT) may also be generated and presented by the video processor circuit 100.

The video processor circuit 100 generally comprises a module (or block) 102, a module (or block) 104, a module (or block) 106, a module (or block) 108 and a module (or block) 110. The analog input signal AIN may be received by the module 102. The digital input signal DIN may be received by the module 104. An internal signal (e.g., DIG) may be generated and presented from the module 102 to the module 104. Another internal signal (e.g., IN) may be generated and presented from the module 104 to the module 106. The module 106 may generate the digital output signal DOUT. The signal DOUT may be presented from the video processor circuit 100 and received internally by the module 110. The module 110 may generate and present the analog output signal AOUT.

The module 102 may be referred to as an analog to digital conversion (ADC) module. The ADC module 102 may be operational to digitize the analog input signal AIN to generate a digital representation in the signal DIG. A conversion resolution of the ADC module 102 may be 8 bits per luminance (luma) sample. Other conversion resolutions may be implemented to meet the criteria of a particular application.

The module 104 may be referred to as a processor module. The processor module 104 may be operational to process the digital pictures received in the signals DIN and/or DIG to generate the signal IN. The processing may include, but is not limited to gamma correction, graphics insertion, sharpening, colorspace conversion, de-interlacing, comb filtering, noise reduction, scaling and pixel enhancement.

The module 106 may be refereed to as a contour reduction module. The contour reduction module 106 may be operational to expand the resolution (e.g., bit depth) of the luma sample values by one or more bits (e.g., two bits or three bits). The contour reduction module 106 may be further operational to reduce contours in the digital pictures. The contour reduction module 106 may be implemented as dedicated hardware and/or software executing in a processor. In some embodiments, the contour reduction module 106 may be located before the processor module 104 to present enhanced/expanded luma data for processing by the processing module 104.

Every source of the digital pictures having a finite bit depth (e.g., 8 bits) generally has some degree of contouring. Contour reduction in the original signal may be achieved by appropriately setting the newly added least-significant bits (e.g., bits 9 and 10, where bit 1 is the most-significant bit). The newly added bits may be set to either (i) fixed values (e.g., 00, 01, 10 or 11 binary) or (ii) calculated values based on the current sample values. In some situations, the original least-significant bit (e.g., bit 8) in relatively clean digital pictures (e.g., uncompressed raw video) may also be modified to reduce the contour effect. For compressed data, the contouring may be stronger in the original source. As such, the contour reduction module 106 may modify several of the original least-significant bits (e.g., bits 6, 7 and 8) of the original signal, in addition to adding the new least-significant bits (e.g., bits 9 and 10), if any. The contour reduction generally modifies one or more least-significant bits of the pixel values in the contour regions so that the modified pixel values are more similar to neighboring pixel values. The modifications are generally biased in the direction of the majority of neighboring pixel values from the current pixel value.

The module 108 may be referred to as a memory module. The memory module 108 may be coupled to the contour reduction module 106 to buffer linestores of luma sample data, sample value differences and temporary intermediate data generated by the contour reduction module 106. In some embodiments, the memory module 108 may also be accessible to the processor module 104.

The module 110 may be referred to as an output digital to analog conversion (DAC) module. The DAC module 110 may be operational to convert the signal DOUT into the analog output signal AOUT. A conversion resolution of the DAC module 110 may be 10 bits per luma sample. Other conversion resolutions may be implemented to meet the criteria of a particular application.

Each of the analog input signal AIN and the digital input signal DIN generally comprise a sequence of interlaced fields and/or frames. The fields and frames may be generically referred to as pictures. The pictures may be formatted as standard definition (e.g., NTSC 640×480 interlaced and PAL 768×576 interlaced), high resolution images (e.g., 1280×720 progressive and 1920×1080 interlaced) and/or other similar video formats. The digital input signal DIN may provide 8-bit of luminance data per pixel.

The signal IN generally comprises the sequence of pictures after being processed by the processing module 104. The signal IN may present the luma samples at the 8-bit resolution. The signal DOUT generally comprises the sequence of pictures after being processed by the contour reduction module 106. The signal DOUT may present the luma samples at 10-bits resolution. Each of the analog output signal AOUT and the digital output signal DOUT generally comprises the same sequence of pictures as received in the input signals AIN/DIN.

The contour reduction module 106 generally provides a method for measuring local activity (or variance) in a neighborhood around the current pixel. For horizontal processing, the contour reduction module 106 may use differences between the current pixel and multiple pixels within a horizontal window. Vertical processing may depend on an amount of memory available to buffer vertical samples. In some embodiments having large memory capacities, differences between the current pixel and multiple pixels within, a vertical window may be processed. In other embodiments, only immediately adjacent vertical pixels may be considered to save on storage space.

Basically, a contour should have a fairly large number of pixels in the window with differences between adjoining pixels values having the same sign (e.g., +1, 0, −1). If sufficient numbers of pixels have the same sign, the current pixel may be modified (e.g., increased bit depth) as the current pixel is considered a contour pixel. If insufficient numbers of pixels have the same sign in the window, the current pixel is considered to be part of a detail (or texture) and not a contour. As such, the current pixel is generally not modified/filtered to avoid removing the detail. A small detail is measured as having a high count of sign changes between adjacent pixels and the current pixel.

The contour reduction module 106 may provide a method to reduce smoothing in the least-significant bits of the luma sample values for small details (vs. large contours). The method may be referred to as "sign-coring" (e.g., a variation of coring based on the sum of the sign of pixel differences instead of linear filtering). The sign-coring method generally (i) reduces contouring on conversion of video from 8 bits to 10 bits (or from any lower bit-depth to a higher bit-depth), (ii) reduces subtle contouring due to MPEG encoding/decoding, (iii) achieves very low amplitude mosquito noise reduction (MNR) and/or (iv) produces very subtle blocking noise reduction (BNR). Other conventional methods exist for dealing with strong MNR and strong BNR, so the minor reductions caused by the sign-coring method may be considered a positive "side-effect". The bit-depth conversion of the contour reduction module 106 may also operate on unconverted video (e.g., when only 8-bit resolution is generated in the output signals AOUT/DOUT. Operating on the unconverted video generally reduces contouring due to the MPEG compression.

In some embodiments, the utilization of the memory 108 may be optimized to buffer only a small number of luma linestores (e.g., storage of a line of luma samples). In other embodiments, the overall performance in the vertical contouring reduction may be improved by buffering additional linestores for utilization in the sign-coring method. Because the vertical contour reduction is not as strong as the horizontal contour reduction, the vertical process is usually performed before the horizontal process. Contour reduction may be performed only on the luma component of the pixels. Contour reduction may be optionally performed on the chrominance (chroma) components of the pixels following the same method as the luma.

Figure 2:
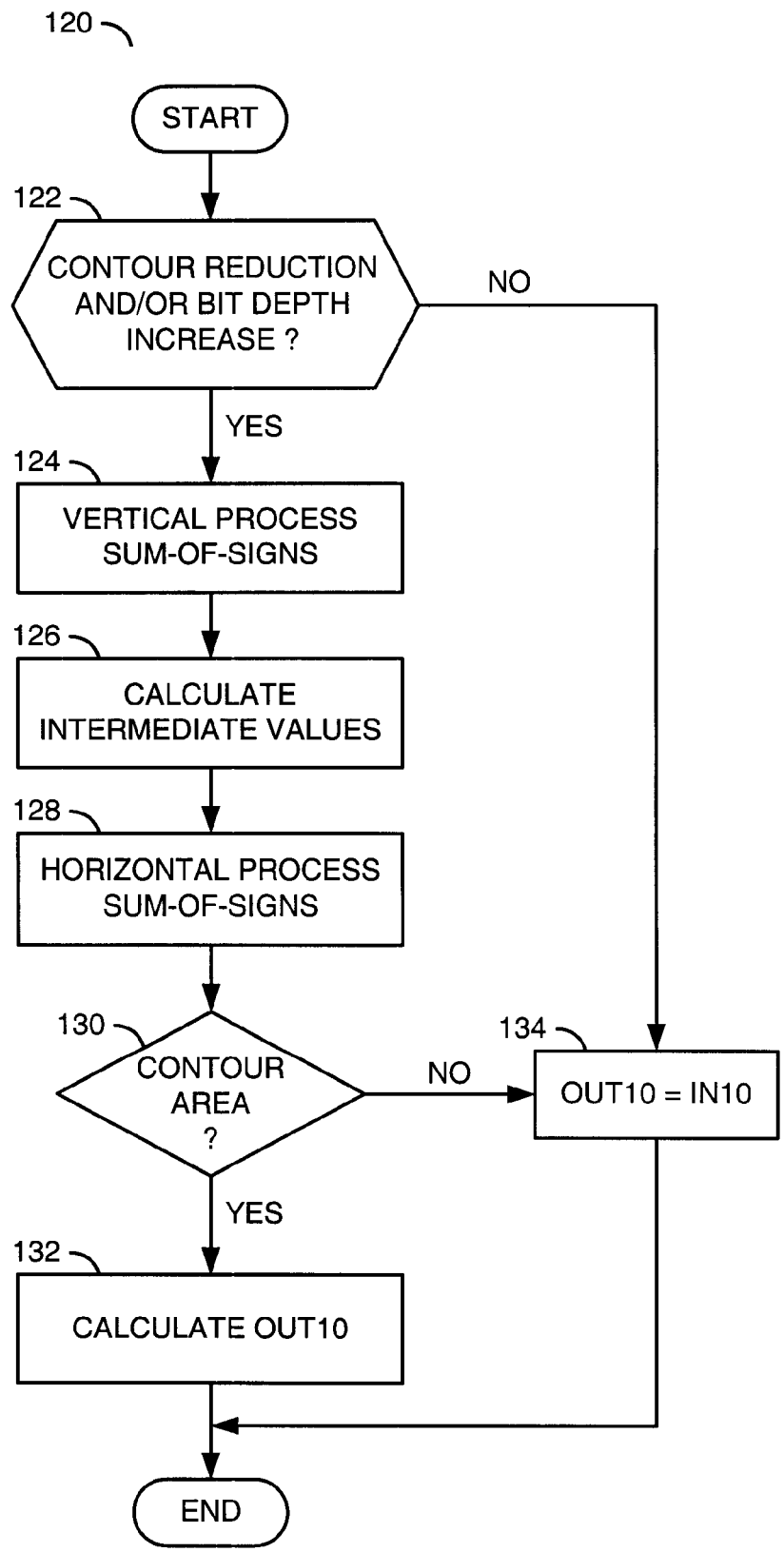
FIG. 2 is a flow diagram of an example implementation of a method for contour reduction.

Referring to FIG. 2, a flow diagram of an example implementation of a first method 120 for contour reduction is shown. The contour reduction method 120 generally comprises a step (or block) 122, a step (or block) 124, a step (or block) 126, a step (or block) 128, a step (or block) 130, a step (or block) 132 and a step (or block) 134. The contour reduction method 120 generally follows a current luma sample at a current pixel location [Y] [X]. The contour reduction method 120 may be applied to each of the pixels in a digital picture being processed by the video processor module 100.

Each luma sample carried in the signal IN may have a value (e.g., IN8 [Y] [X]). The coordinates [Y] [X] may be measured counting from the top-left corner of the digital picture downward (e.g., increasing Y) and to the right (e.g., increasing X). Each expanded luma sample carried in the signal DOUT may have a value (e.g., OUT10 [Y] [X]). The range of the output values OUT10 (e.g., 10-bit) may be greater than the range of the input values IN8 (e.g., 8-bit). In some embodiments, the output values OUT10 may be implemented as 11-bit values. The sign-coring method 120 may be applied to the 8-bit inputs to generate essentially 8-bit outputs (e.g., the least-significant bits are fixed), even when the bit-depth is not increased, to reduce MPEG contours.

Several programmable variables may be used by the sign-coring method 120 to adapt the method to a particular video format and application. A variable (e.g., HTAPS) may define a horizontal size of the window over which the pixels may be processed. The variable HTAPS is generally programmable from a set of values (e.g., [2, 4, 6, 8, 10, 12, 14, 16]). Default values of 8, 10 and 14 may be preprogrammed for standard definition pictures, 720 progressive pictures and 1080 interlaced pictures, respectively.

A variable (e.g., VTAPS) may define a vertical size of the window over which the pixels may be processed. The variable VTAPS is generally programmable from a set of values (e.g., [2, 4, 6, 8, 10, 12, 14, 16]). Default values of 8, 10 and 14 may be preprogrammed for standard definition pictures, 720 progressive pictures and 1080 interlaced pictures, respectively. In some embodiment, the value of VTAPS may be set to 4 regardless of the video format.

A first threshold variable (e.g., THR1) may define threshold for a maximum amount of pixel change permitted. The threshold THR1 may be programmable from a set of values (e.g., [1, 2, 3, 4, 5, 6, 7, 8]). A default value of 1 may be preprogrammed for 8-to-10 bit conversion of pictures with no MPEG compression artifacts to reduce.

A second threshold variable (e.g., THR2) may define a threshold used for pixel value comparisons when determining a sign between adjacent pixels. The second threshold variable THR2 may be programmable with value selected from a set of values (e.g., [0, 1, 2, 4, 5, 6, 7, 8]. A value of 0 may be preprogrammed for 8-to-10 bit conversions of a clean source of the pictures (e.g., little to no noise). A default value of 1 may be preprogrammed for 8-to-10 bit conversions of uncompressed pictures (e.g., no MPEG) and/or lightly compressed pictures with no significant compression related contouring. Non-zero values of the second threshold THR2 generally causes the sign-coring method 120 to perform better when trying to reduce contouring in compressed video. Larger values of THR2 generally make the calculations less sensitive to noise by only accounting for a non-zero sign if the magnitude of the difference is sufficiently large. Otherwise, the larger thresholds may result in difference exclusions (e.g., zero value signs) where the absolute values of the differences are smaller than the threshold.

A shift variable (e.g., SHFT) may define an integer constant applied to the pixel changes (e.g., by shifting the binary value SHFT bits). The variable SHFT may be programmable from a set of values (e.g., [−1, 0, 1, 2]). A default value of 0 may be preprogrammed for clean source 8-to-10 bit conversion.

A texture variable (e.g., TXT) may define a level that distinguished between textured areas and contour areas. The variable TXT may be programmable from a set of values (e.g., [0, 1, 2, 3, 4, 6, 8, 12]). A default value of 2 may be preprogrammed for HTAPS=8.

Several functions may be used in the sign-coring method 120. A sign function (e.g., SGN) may be defined as SGN(Z)= ((Z>THR2)?1:((Z<−THR2)?(−1):0)). SGN(Z) may evaluate to (i) +1 if Z is greater than the second threshold THR2, (ii) −1 if Z is less than a negative value of the second threshold THR2 and (iii) zero if Z is between THR2 and −THR2, inclusive.

A clipping function (e.g., CLIP) may be defined as CLIP (Z, BOT, TOP)=min(max(Z, BOT), TOP). The parameter BOT may define a bottom value at which to clip (e.g., clip to BOT if Z<BOT). The parameter TOP may define a top value at which to clip (e.g., clip to TOP if Z>TOP).

The sign-coring method 120 generally counts sum of signs of adjacent pixel differences relative to the current pixel and modifies the least-significant bits of the current pixel based on whether the adjacent pixels are on balance larger or smaller in amplitude (e.g., luma or chorma). The method 120 may also count a total number of adjacent horizontal pixel changes. If the count is too high, the current pixel may not be modified since the current pixel is a "detail" in a textured area, not a "contour".

The sign-coring method 120 generally starts by checking if the 8-bit current pixel (e.g., IN8 [Y] [X]) should have a contour reduction and/or a depth conversion in the step 122. If a contour reduction and/or a depth conversion (e.g., depth expansion) should be performed (e.g., the YES branch of step 122), a vertical processing for the vertical sum-of-sign values may be performed in the step 124. A 10-bit intermediate value for each sample may be calculated in the step 126 based on the vertical sum-of-sign values, the first threshold THR1 and the shift value SHFT. A horizontal processing for the horizontal sum-of-sign values may then be performed in the step 128.

A check may be made in the step 130 to determine if the current pixel is part of a contour or part of a texture. If the current pixel is a contour sample (e.g., the YES branch of step 130), a 10-bit output value (e.g., OUT10 [Y] [X]) may be calculated in the step 132 based on the intermediate value, the horizontal sum-of-sign value, the first threshold THR1 and the shift value SHFT. If the current pixel is not part of a contour (e.g., the NO branch of step 130), the 10-bit output value may be calculated in the step 134 by multiplying the 8-bit input value IN8 [Y] [X] by an integer constant. If neither a depth conversion or a bit depth increase is to be performed on the current pixel (e.g., the NO branch of step 122), the 10-bit output value may be calculated in the step 134. The above process may be repeated for each pixel (e.g., luma value and optionally chroma value) in each digital picture. Where the window defined by HTAPS and VTAPS extends over the boundaries of a digital picture, extra columns and/or rows of pixels may be synthesized from one or more columns and/or rows proximate the boundaries to effectively extend the picture.

Figure 3:
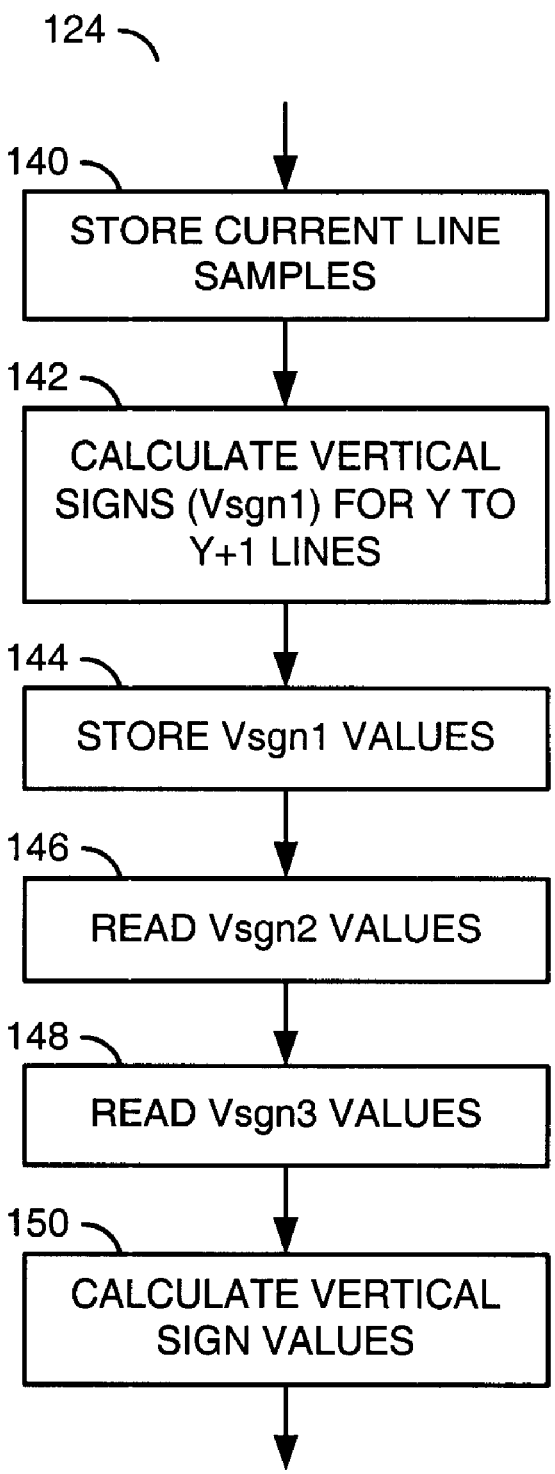
FIG. 3 is a flow diagram of a first example method for implementing a vertical processing step.

Referring to FIG. 3, a flow diagram of a first example method for implementing the vertical processing step 124 is shown. The vertical processing step 124 generally comprises a step (or block) 140, a step (or block) 142, a step (or block) 144, a step (or block) 146, a step (or block) 148 and a step (or block) 150. The first example method may be implemented to minimize the amount of data buffered in the memory 108 (e.g., VTAPS=4). The method may be applied to each input luma sample IN8 [Y] [X].

In the step 140, the current line in the signal IN may be written into the memory 108. First vertical sign values (e.g., Vsgn1 [Y] [X]) may then be calculated for each sample X between the current line Y and a next line Y+1 in the step 142 per equation 1 as follows:

$$Vsgn1[Y][X]=SGN(IN8[Y][X]-IN8[Y+1][X]) \qquad \text{Eq. (1)}$$

The resulting Vsgn1 values may then be stored in the memory 108 in the step 144. Each of the Vsgn1 values may hold one of three possible values (e.g., +1, 0, −1). Therefore, each of the Vsgn1 values may be stored as a 2-bit value.

In the step 146, previously calculated section vertical sign values (e.g., Vsgn2 [Y] [X]) may be read from the memory 108. The Vsgn2 values may have been calculated between the current line Y and a previous line Y−1 (when the previous line was the current line) per equation 2 as follows:

$$Vsgn2[Y][X]=SGN(IN8[Y][X]-IN8[Y-1][X]) \qquad \text{Eq. (2)}$$

Each of the Vsgn2 values may be stored in the memory 108 in a 2-bit linestore.

In the step 148, previously calculated third vertical sign values (e.g., Vsgn3 [Y] [X]) may be read from the memory 108. The Vsgn2 values may have been calculated between the previous line Y−1 and an earlier previous line Y−2 (when the earlier previous line was the current line) per equation 3 as follows:

$$Vsgn3[Y][X]=SGN(IN8[y-1][X]-IN8[Y-2][X]) \qquad \text{Eq. (3)}$$

Each of the Vsgn3 values may be stored in the memory 108 in a 2-bit linestore.

Based on the vertical sign values, a final vertical sign value (e.g., Vsgn [Y] [X]) may be calculated for each of the samples in the step 150 per equation 4 as follows:

$$Vsgn[Y][X] = Vsgn1 + Vsgn2 + CLIP(Vsgn2 + Vsgn3, -1, 1) \qquad \text{Eq. (4)}$$

The above steps 140-150 may be repeated for each subsequent line in the picture. As each new line is considered, the old Vsgn3 values and the previously buffered input luma samples in line Y may be discarded (e.g., overwritten) from the memory 108. Thereafter, (i) the next line may be buffered (as the new current line), (ii) new Vsgn1 values may be calculated and (iii) new Vsgn values may be calculated. In calculating the new Vsgn values, the old Vsgn2 values may become the new Vsgn3 values and the old Vsgn1 value may become the new Vsgn2 values.

Storage of the sample values IN8 of the current line Y in the memory 108 generally utilizes 8 bits/sample×LineWidth samples/line×1 line=8×LineWidth bits. The Vsgn1 values may be written into the memory 108 in place of the sample values IN8. Storage of the Vsgn2 and Vsgn3 values may consume 2 bits/sample×LineWidth samples/line×2 lines=4× LineWidth bits.

Figure 4:
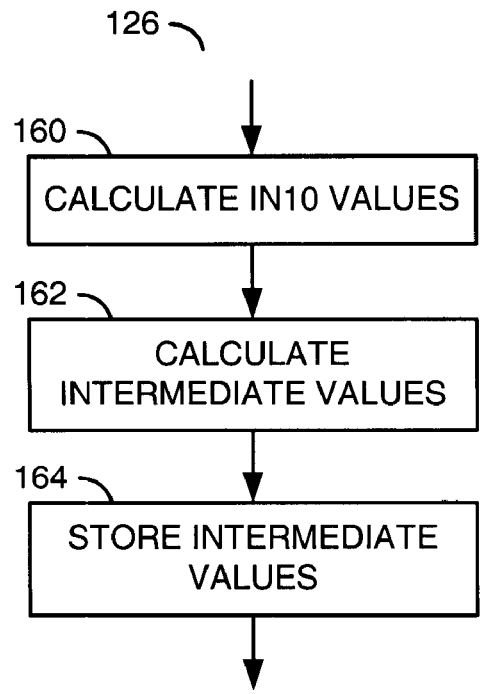
FIG. 4 is a flow diagram of an example implementation of an intermediate value step.

Referring to FIG. 4, a flow diagram of an example implementation of the intermediate value step 126 is shown. The step 126 generally comprises a step (or block) 160, a step (or block) 162 and a step (or block) 164. In the step 160, the input value IN8 may be expanded from an 8-bit value to a 10-bit value per equation 5 as follows:

$$In10[Y][X] = (IN8[Y][X] << 2) | CONST \qquad \text{Eq. (5)}$$

where "<<" generally indicates a shift left, the symbol "|" is a logical OR, and the constant value CONST may be any of 0×0, 0×1, or 0×2 hexadecimal. For simplicity, an implementation may support only CONST=0×0.

In the step 162, intermediate values (e.g., A [Y] [X]) may be calculated for the samples per equation 6 as follows:

$$A[Y][X] = In10+[Y][X] + [CLIP(Vsgn, -THR1, THR1) << (SHFT+1)] >> 1 \qquad \text{Eq. (6)}$$

wherein ">>" generally indicates a shift right. Equation 6 may include a calculation of one or more new least-significant-bits useful for the contour reduction. The intermediate values A may then be stored in the memory 108 in the step 164. Storage of the intermediate values A may use a minimum of 10 bits/sample×(2×HTAPS+1) samples/line×1 line=10× (2×HTAPS+1) bits for any given window HTAPS samples in width. To store an entire line of the intermediate values A may use 10 bits/sample×LineWidth samples/line×1 line=10× LineWidth bits.

Figure 5:
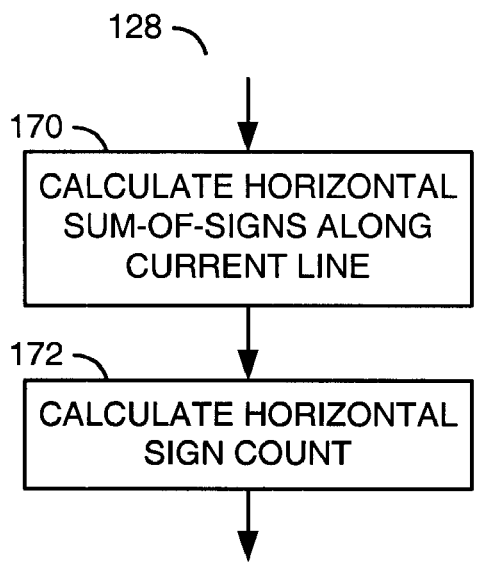
FIG. 5 is a flow diagram of an example implementation of a horizontal processing step.

Referring to FIG. 5, a flow diagram of an example implementation of the horizontal processing step 128 is shown. The step 128 generally comprises a step (or block) 170 and a step (or block) 172. In the step 170, horizontal sum-of-signs (e.g., Hsgn [Y] [X]) may be calculated along the current line Y in a window about the position X per equation 7 as follows:

$$Hsgn[Y][X] = SUM(SGN(A[Y][X] - A[Y][X+H]), \text{ for } H=-HTAPS, \ldots, -2, -1, 1, 2, \ldots, HTAPS) \qquad \text{Eq. (7)}$$

In the step 172, a horizontal sign count (e.g., Hsgncnt [Y] [X]) may be calculated per equation 8 as follows:

$$Hsgncnt[Y][X] = SUM((A[Y][X] - A[Y][X+H])!=0, \text{ for } H=-HTAPS, \ldots, -2, -1, 1, 2, \ldots, HTAPS) \qquad \text{Eq. (8)}$$

where the symbol "!=" may indicate "not equal to".

Referring again to FIG. 2, a determination if the current sample is part of a contour or not (e.g., step 130) may be based on the horizontal sign count of equation 8. If Hsgncnt is greater than a value (2×HTAPS)−TXT, the sample (pixel) is part of a texture or detail. Therefore, the output value (e.g., OUT10 [Y] [X]) may be calculated (e.g., step 134) per equation 9 as follows:

$$Out10[Y][X] = In10[Y][X] \qquad \text{Eq. (9)}$$

If Hsgncnt is less than or equal to the value (2×HTAPS)−TXT, the sample may be considered to be part of a contour. As such, the output value may be calculated (e.g., step 132) per equation 10 as follows:

$$Out10[Y][X] = A[Y][X] + [CLIP(Hsgn, -THR1, THR1) << (SHFT+1)] >> 1 \qquad \text{Eq. (10)}$$

If no depth conversion is to be performed (e.g., the NO branch of step 122), an 8-bit output value (e.g., OUT8=IN8) may be generated. Where implemented with a single line delay from the input, (i) the vertical differences Vsgn1 may be calculated from the currently buffered pixels and (ii) Vsgn2 and Vsgn3 may be stored in at least a 3.2-bit (e.g., 9 possible combinations of Vsgn2 and Vsgn3) line buffer in the memory 108. In some embodiment, the Vsgn2 values and the Vsgn3 values may be stored as a 4-bit line buffer (e.g., a 0.5 luma linestore) with 2-bits for each of Vsgn2 and Vsgn3. As such, the contour reduction method 120 may be implemented in as little as 1.5 luma linestores. The above contour reduction method 120 generally reduces contouring effectively without creating (i) "halo" effect of standard coring, (ii) the blurriness of lowpass filtering or (iii) the noisiness of comfort noise addition.

A performance may be improved by using more of the memory 108 (or a cahce memory) to store a greater number of linestores. In particular, the window about the current sample position may be increased vertically from four lines (e.g., Y+1 to Y−2) to match (e.g., VTAPS=HTAPS) the horizontal width (e.g., Y+VTAPS to Y−VTAPS). In some embodiments, data for the additional linestores may be stored as 2-bit samples, similar to the Vsgn2 values and the Vsgn3 values. In other embodiments, the complete 8-bit input sample values IN8 may be stored for many lines.

Figure 6:
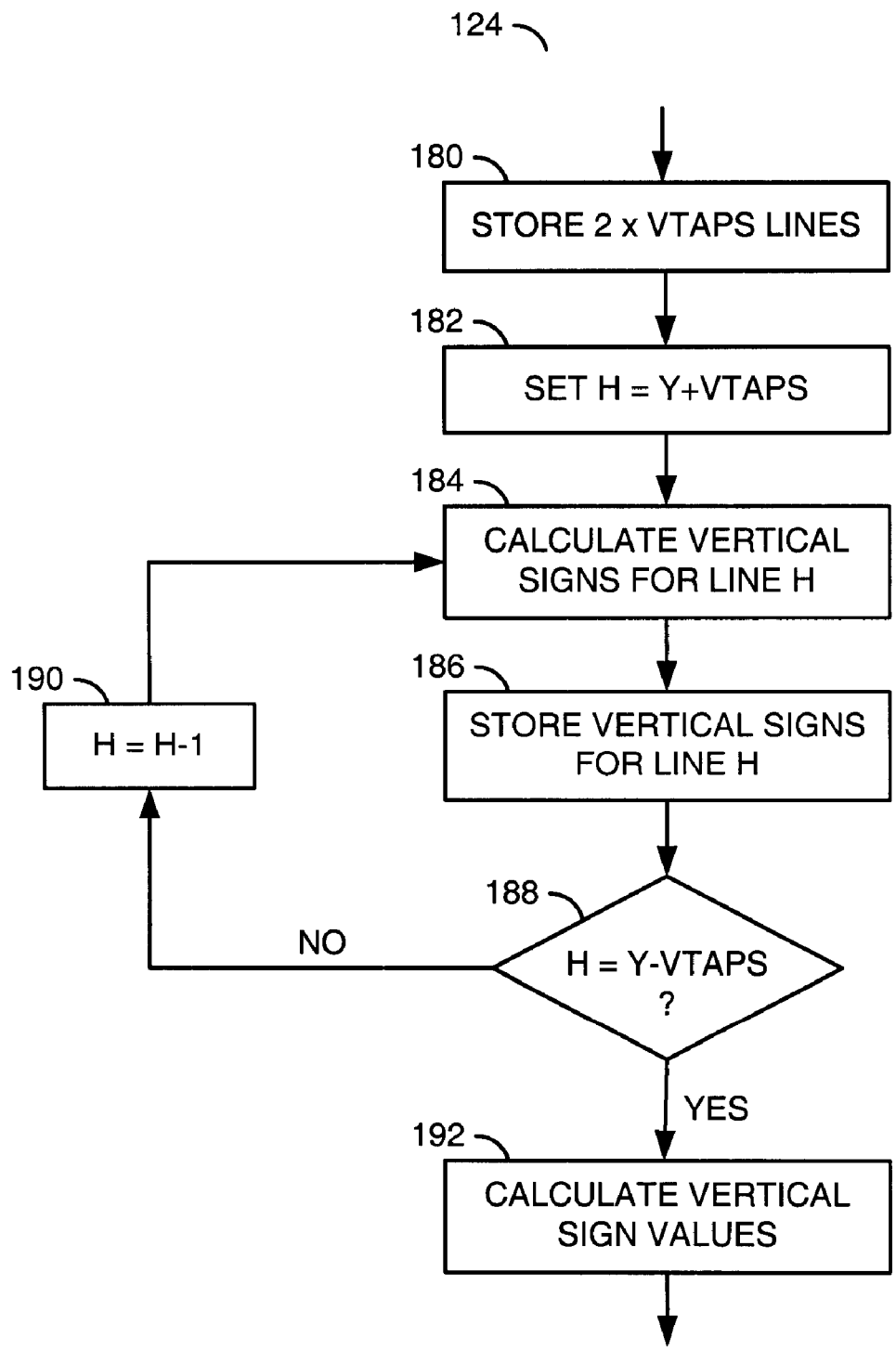
FIG. 6 is a flow diagram of a second example method for implementing the vertical processing step.

Referring to FIG. 6, a flow diagram of a second example method for implementing the vertical processing step 124 is shown. The vertical processing step 124 generally comprises a step (or block) 180, a step (or block) 182, a step (or block) 184, a step (or block) 186, a step (or block) 188, a step (or block) 190 and a step (or block) 192. The vertical processing may operate on each position X. The method may begin by storing (i) a VTAPS number of lines above and (ii) the VTAPS number of lines below the current line Y in the step 180. For each given horizontal position X, vertical processing may begin with processing at the lowest line H=Y+VTAPS in the step 182. In the step 184, the first vertical sign value Vsgn1 may be calculated between the current line H and the next line H+1 per equation 11 as follows:

$$Vsgn1[H][X] = SGN(IN8[H][X] - IN8[H+1][X]) \qquad \text{Eq. (11)}$$

The calculated value of Vsgn1 may then be stored in the step 186.

A check may be performed in the step 188 to determine if more horizontal lines remain to be processed. If more lines exist to be processed (e.g., the NO branch of step 188), the current line may be decremented in the step 190. The next vertical sign value (e.g., Vsgn2, Vsgn3, Vsgn3, Vsgn4, etc.) may be calculated in the step 182. Once all of the lines have been processed (e.g., the YES branch of step 188), the Vsgn value may be calculated in the step 192. Processing may then continue with calculating the intermediate values A [y] [x] based on the Vsgn value in step 126 (FIG. 2).

The function performed by the flow diagrams of FIGS. 2-6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method for contour reduction in a digital picture, comprising the steps of:
    (A) calculating a plurality of first vertical sign values of a plurality of samples in a current line of said digital picture using a circuit, wherein said samples have corresponding input values and said first vertical sign values comprise first differences between said input values in said current line and said input values in another line of said digital picture;
    (B) calculating a plurality of horizontal sum-of-signs along said current line; and
    (C) generating a plurality of output values in a contour area based on (i) said first vertical sign values and (ii) said horizontal sum-of-signs, wherein one of said output values corresponding to each one of said samples.

2. The method according to claim 1, further comprising the step of:
    reading a plurality of second vertical sign values of said current line from a memory.

3. The method according to claim 2, wherein (i) said another line comprises a next line of said digital picture and (ii) said second vertical sign values comprises second differences between said input values in said current line and said input values in a previous line of said digital picture.

4. The method according to claim 1, wherein each of said first vertical sign values comprises (i) a positive one value if said first difference between a vertically adjoining pair of said samples is greater than a threshold, (ii) a negative one value if said first difference is less than a negative of said threshold and (iii) a zero value otherwise, wherein said threshold is greater than zero.

5. The method according to claim 1, further comprising the step of:
    calculating a plurality of intermediate values based on (i) said first vertical sign values and (ii) a plurality of second vertical sign values, wherein said output values in said contour area are based on said (i) intermediate values and (ii) said horizontal sum-of-signs.

6. The method according to claim 5, further comprising the step of:
    reading a plurality of third vertical sign values from a memory, wherein said intermediate values are based on (i) said first vertical sign values, (ii) said second vertical sign values and (iii) said third vertical sign values.

7. The method according to claim 5, wherein each of said horizontal sum-of-signs comprises a sum of a plurality of amplitude differences between pairs of said intermediate values.

8. The method according to claim 5, further comprises the steps of:
    calculating a plurality of horizontal signs, wherein each of said horizontal signs comprise an amplitude difference between a pair of said intermediate values.

9. The method according to claim 8, further comprising the step of:
    counting a number of said horizontal signs having a non-zero value.

10. The method according to claim 9, further comprising the step of:
    generating said output values outside said contour area to an integer multiple of said input values where said number of said horizontal signs exceeds a preprogrammed value.

11. An apparatus comprising:
    a memory configured to buffer a plurality of samples in a current line of a digital picture; and
    a circuit configured to (i) calculate a plurality of first vertical sign values of said samples in said current line, wherein said samples have corresponding input values and said first vertical sign values comprise first differences between said input values in said current line and said input values in another line of said digital picture, (ii) calculate a plurality of horizontal sum-of-signs along said current line and (iii) generate a plurality of output values in a contour area based on (a) said first vertical sign values and (b) said horizontal sum-of-signs, wherein one of said output values corresponds to each one of said samples.

12. The apparatus according to claim 11, wherein said circuit is further configured to read a plurality of second vertical sign values of said current line from said memory.

13. The apparatus according to claim 12, wherein (i) said another line comprises a next line of said digital picture and (ii) said second vertical sign values comprises second differences between said input values in said current line and said input values in a previous line of said digital picture.

14. The apparatus according to claim 11, wherein each of said first vertical sign values comprises (i) a positive one value if said first difference between a vertically adjoining pair of said samples is greater than a threshold, (ii) a negative one value if said first difference is less than a negative of said threshold and (iii) a zero value otherwise, wherein said threshold is greater than zero.

15. The apparatus according to claim 11, wherein said circuit is further configured to calculate a plurality of intermediate values based on (i) said first vertical sign values and (ii) a plurality of second vertical sign values, wherein said output values in said contour area are based on said (i) intermediate values and (ii) said horizontal sum-of-signs.

16. The apparatus according to claim 15, wherein said circuit is further configured to read a plurality of third vertical sign values from said memory, wherein said intermediate values are based on (i) said first vertical sign values, (ii) said second vertical sign values and (iii) said third vertical sign values.

17. The apparatus according to claim 15, wherein each of said horizontal sum-of-signs comprises a sum of a plurality of amplitude differences between pairs of said intermediate values.

18. The apparatus according to claim 15, wherein said circuit is further configured to calculate a plurality of horizontal signs, wherein each of said horizontal signs comprise an amplitude difference between a pair of said intermediate values.

19. The apparatus according to claim 18, wherein said circuit is further configured to (ii) count a number of said horizontal signs having a non-zero value and (ii) generate said output values outside said contour area to an integer multiple of said input values where said number of said horizontal signs exceeds a preprogrammed value.

20. An apparatus comprising:
means for buffering a plurality of samples in a current line of a digital picture; and
means for processing configured to (i) calculate a plurality of first vertical sign values of said samples in said current line, wherein said samples have corresponding input values and said first vertical sign values comprise first differences between said input values in said current line and said input values in another line of said digital picture, (ii) calculate a plurality of horizontal sum-of-signs along said current line and (iii) generate a plurality of output values in a contour area based on (a) said first vertical sign values and (b) said horizontal sum-of-signs, one of said output values corresponding to each one of said samples.

\* \* \* \* \*